Nov. 29, 1960  J. WEILL  2,962,614
COMPENSATED IONIZATION CHAMBERS
Filed July 25, 1957  5 Sheets-Sheet 3

United States Patent Office 2,962,614
Patented Nov. 29, 1960

2,962,614
COMPENSATED IONIZATION CHAMBERS

Jacky Weill, Saint-Cloud, France, assignor to Commissariat a l'Energie Atomique, Paris, France, a society of France Filed July 25, 1957, Ser. No. 674,220

Claims priority, application France Aug. 2, 1956

4 Claims. (Cl. 313—61)

The present invention relates to compensated ionization chambers serving to detect and/or to measure neutron fluxes, in particular in nuclear reactors.

Such chambers include at least two distinct main elementary chambers through which passes the flux to be studied, only one of these elementary chambers being responsive to the neutron flux and the other chamber, which is a compensation chamber, being responsive only to the effects of other radiations and serving substantially to compensate the effects of said other radiations in the first elementary chamber.

The object of the present invention is to provide an apparatus of this kind with improved compensating means.

The invention is essentially characterized in that an apparatus as above described includes, in addition to said elementary chambers, at least one auxiliary compensating chamber the importance of which is adjustable easily and accurately so as to improve the compensation obtained by the main compensation chamber whatever be the defects or deteriorations thereof.

It should first be reminded that in order to control the neutron fluxes of nuclear reactors, it is customary to make use of ionization chambers the walls of which are coated with a substance which, under the effect of irradiation, is transmuted so as to give an ionizing radiation which can be measured by the chamber.

For instance, control of thermal neutron reactors is performed by means of chambers coated with boron 10. Under the effect of the neutron radiation, the boron coating produces alpha rays according to the following reaction:

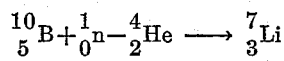

$$^{10}_{5}B + ^{1}_{0}n - ^{4}_{2}He \longrightarrow ^{7}_{3}Li$$

The alpha particle is counted in the chamber in the usual manner used for ionizing particles.

Together with the neutrons, there is also in the reactor a gamma radiation due to the products contained therein and in particular to the fission products. This gamma radiation produces in the chamber an ionization current which may, when the reactor is running at high power, be in a ratio ranging from $10^{-2}$ to $10^{-3}$ to the ionization current due to neutrons.

When there are important power drops, and also when the reactor is being started, this ratio becomes different due to the fact that the gamma activity remains effective for a relatively long time. This ratio may, in some cases, become close to 1. It then causes an important error in the determination of the neutron power of the reactor.

In order to obviate this drawback, several solutions have been already suggested, for instance as follows:

Impulse chambers, either of the disintegration type (for instance with boron 10 for thermal neutrons) or of the fission type (for instance with uranium 235), combined with amplitude discriminators which stop, before counting, the impulses due to gamma rays; these two systems are efficient but call for big and delicate apparatus and they necessitate the removal of the detectors when the reactor is running on full power so as to avoid activation or even destruction of said detectors;

Boron 10 chambers provided with bismuth screens having a high absorption cross-section for gamma rays and a lower capture cross-section for neutrons;

Compensated chambers formed substantially by parallel plates which constitute the electrodes, a diagrammatical view of such a chamber being shown on Fig. 1 of the appended drawings.

Plates 1, 2, 3, 4, 5, 6 and 7 are arranged in such manner that some of them, such as 2, 4 and 6, which are connected with the collecting electrode 10, are each interposed between two other plates one of which constitutes a high positive potential electrode connected with a source (not shown) by conductor 8 whereas the other is a high negative potential electrode connected with a source (not shown) by conductor 9.

Thus, on Fig. 1, plate 2 is interposed between plate 1, which is connected with the high negative potential, and plate 3, which is connected with the high positive potential. In a likewise manner, plate 4 is interposed between the positive plate 3 and the negative plate 5. Plate 6 is interposed between the negaltive plate 5 and the positive plate 7.

The plate connected with the high positive potential and the plate connected with the high negative potential determine, with the collecting plate interposed between them, two elementary ionization chambers in which the respective ionization currents are of opposed signs. The current collected on the collecting plate represents the difference between the ionization currents of the two elementary chambers.

The faces of plates 2 and 3, 3 and 4, 6 and 7, which are located opposite each other, are covered with boron 10 (shown in dotted lines). The spaces between the above mentioned plates constitute elements of chambers I, II, III, respectively. On the collecting electrode 10, there is received a current which is the sum of the current $I_n$, proportional to the number of disintegrations and therefore to the flux of neutrons, and of the current $I_{gamma}$, proportional to the gamma radiation, that is to say:

$$I_n + I_{gamma}$$

The other elements of each of these chambers I, II, III, which do not contain boron, give only a current $I_{gamma}$. The resultant current that is collected will therefore be:

$$I_n + I_{gamma} - I_{gamma} = I_n$$

provided, however, that the $I_{gamma}$ currents of the two elementary chambers exactly compensate each other. This resultant current is measured at M.

The apparatus shown on Fig. 1 is constituted by three compensated chambers I, II, III superimposed on each other, only the third of these chambers being directly exposed to the neutron flux indicated by the parallel arrows at the bottom of Fig. 1. Due to the absorption of the neutrons by the successive boron layers, there is no advantages in using a greater number of chambers because calculation and experience teach that one more boron deposit, which would be the seventh one, would contribute only 4% of the ionization current.

Boron 10 undergoes transmutation only under the effect of thermal neutrons. For the detection of neutrons of different energies, it would be necessary to use coatings of suitable substances.

Compensation is complete when the currents due to gamma rays are equal and of opposed signs. Actually, this compensation is rarely complete. It depends chiefly:

(a) Upon the accuracy of the ionized gaseous volumes,
(b) Upon the absorption of gamma rays by the respective collecting plates, (c) Upon the distribution of the gas with which the chambers are filled, (d) Upon wall effects.

Some of these parameters may modify the above mentioned compensation either because the correction was not satisfactory when the apparatus was made or rather because the apparatus has become deteriorated and has modified the equilibrium of one of these parameters.

In order exactly to adjust the compensation of the effects of radiations others than neutrons, it has already been suggested to vary as a whole the importance of the main compensation chamber, a process which does not modify the sensitivity of the apparatus to neutrons but which requires a complicated construction, difficult to adjust, which is detrimental of the accuracy of the compensation obtained. Furthermore, such a construction cannot be adapted to existing conventional compensated ionization chambers.

In order to obviate this drawback, there is added, according to the invention, to the compensated chamber or chambers as above described, at least one auxiliary compensation chamber the low value of which (which may become zero) can be adjusted independently, easily and accurately so as to obtain an improved compensation.

In other words, the adjustment according to the invention is a finishing adjustment acting only on small volume chambers; simplicity and accuracy of this adjustment are accordingly improved.

According to a preferred embodiment of the present invention, the auxiliary ionization chamber is constituted by the spaces existing between the areas of alternate plates (preferably parallel) which are facing each other and the dimensions of which can be adjusted easily and accurately in particular by angular displacement of one of the plates about an axis perpendicular thereto.

Preferred embodiments of this invention will be hereinafter described with reference to the accompanying drawings given merely by way of example and in which:

Fig. 2 diagrammatically illustrates the principle on which the invention is based.

On these drawings, only the elements necessary for a good understanding of the invention have been shown, corresponding elements in different figures being indicated by the same reference numerals respectively.

Figure 1:
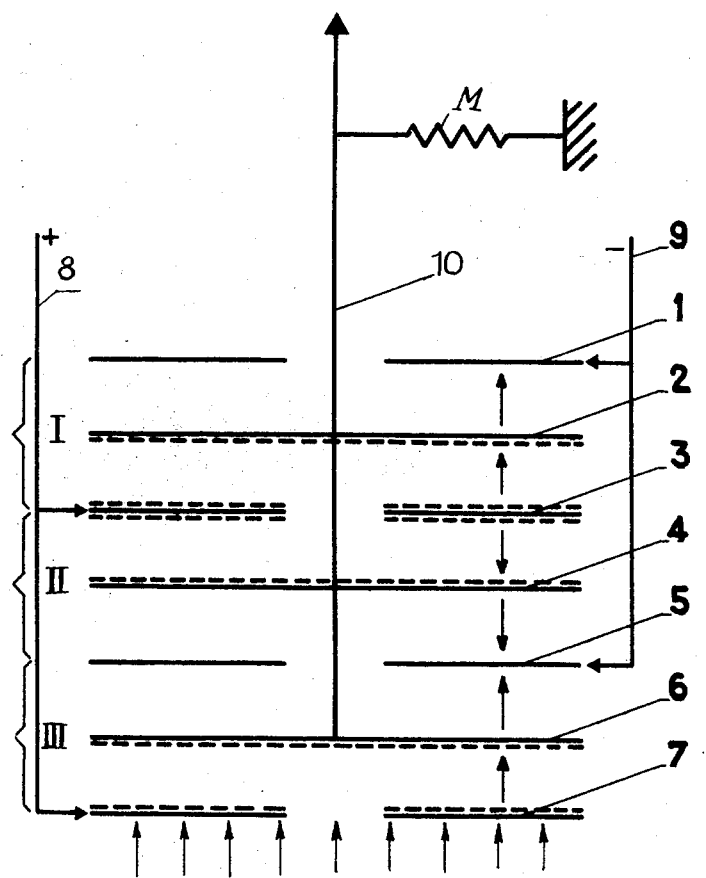

The apparatus disclosed by Fig. 2 includes the elements already described with reference to Fig. 1, to wit plates 1, 2, 3, 4, 5, 6 and 7 forming chambers I, II, III. Plates 2, 3, 4, 6 and 7 are coated with boron 10, as shown by the dotted lines.

Outside of the casing 16 of the ionization chamber system, there is the compensating ionization chamber comprising a movable plate 12 mounted on a spindle electrically connected with the collecting electrode 10 and four stationary plates 11, 13, 14 and 15. Plates 11 and 13 are connected with the positive high voltage terminal 8 and plates 14 and 15 with the negative high voltage terminal 9.

This auxiliary device thus includes two auxiliary ionization chambers responsive only to gamma rays and the respective ionization currents of which are in opposition. The differential current thus obtained is, according to its sign, added to or subtracted from the current given by the main ionization chamber apparatus.

In order to adjust the apparatus, it is placed in an impure neutron flux, that is to say a neutron flux mixed with a gamma rays flux such as that obtained in a channel of a nuclear reactor. Across the path of this flux, at the inlet of the apparatus, there is mounted a screen capable of selectively absorbing neutrons but not gamma rays (for instance a screen made chiefly of boron or cadmium). Thus, the apparatus is sensitive only to gamma rays. Plate 12 is then rotated until the indication read on the measurement apparatus M passes through a minimum. To this minimum corresponds the maximum compensation of the parasitic gamma radiations.

Figure 2:
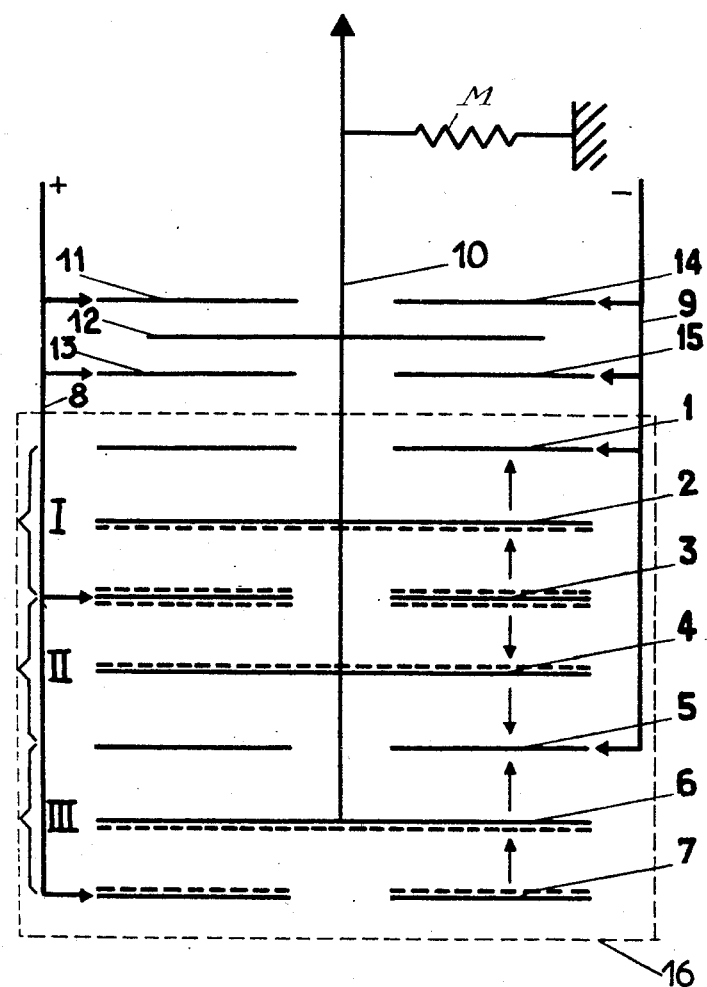

It should be noted that this minimum is generally reached through positive values of the intensity read on the measurement apparatus, if the first chamber attacked by the neutron flux when penetrating into the apparatus is connected with the positive terminal, which is the case in the construction of Fig. 2.

Figure 3:
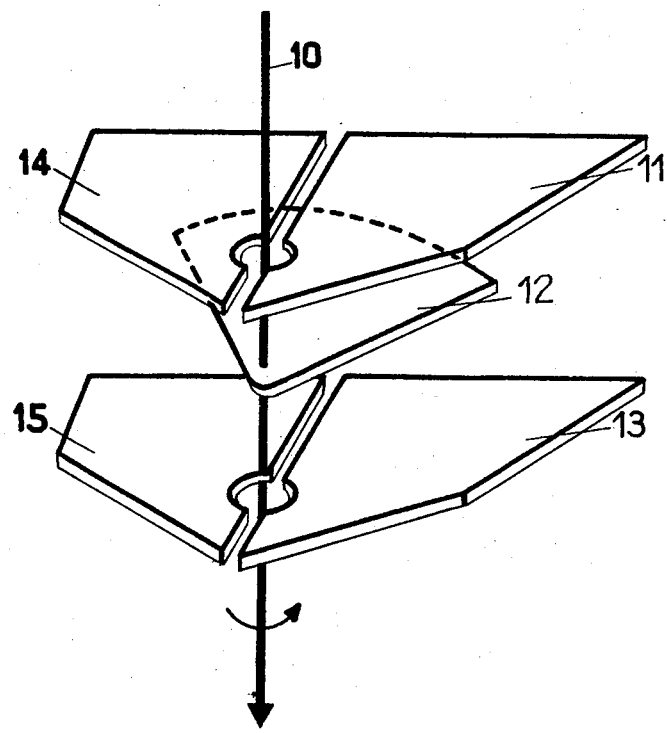
Fig. 3 is a perspective view of the relative arrangement of means for constituting the above mentioned auxiliary chamber.

Fig. 3 shows a preferred arrangement of plates 11 to 15. Of course, the shape of these plates may be modified at will.

Figure 4:
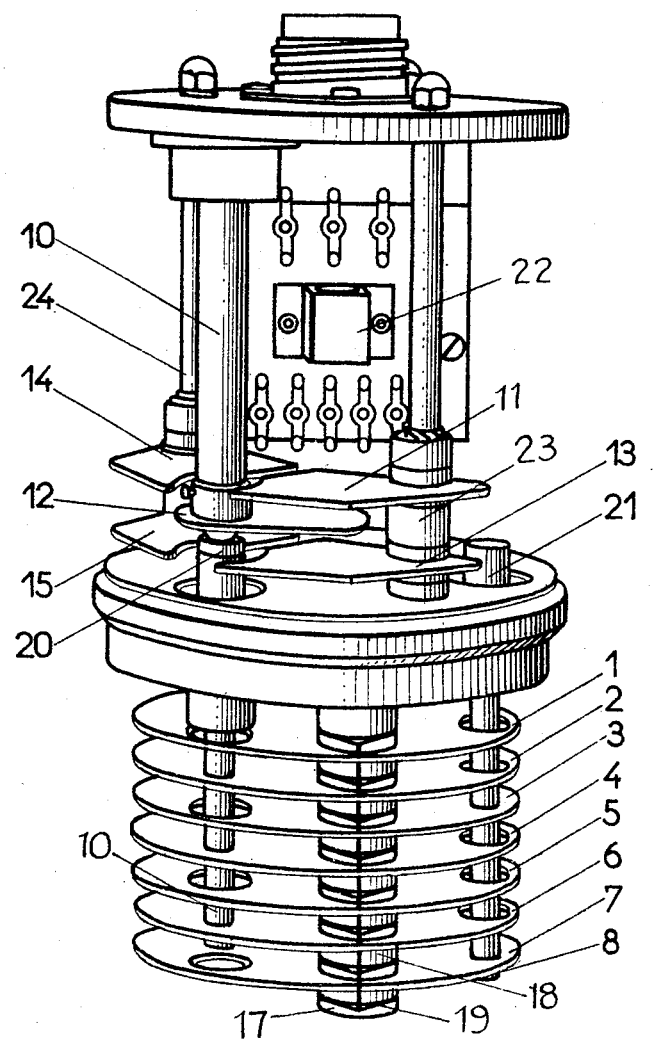
Fig. 4 is a perspective view of an embodiment of this invention.

In the embodiment of Fig. 4, with the exception of the insulators (which are for instance made of a ceramic material of the steatite type) and of the detectors coatings, the only material used in the apparatus is an alloy of the type known as duralumin, the mechanical properties of which are superior to those of aluminum. However, it is necessary to make use of a duralumin containing less than 0.3% of manganese, the capture cross-section of which is relatively important.

The positive and negative high voltage of the electrodes of each of the main chambers are each constituted by two plates having a thickness of 1 mm. and a diameter of 80 mm. Plates 3 and 7 are connected with the positive source through conductor 8 and plates 1 and 5 are connected to the negative source through a conductor not shown. Between the four plates 1, 3, 5 and 7 are interposed three collector plates 2, 4 and 6 of the same diameter of the preceding ones and 0.5 mm. thick, said last mentioned plates being connected with the collecting electrode 10.

All these plates are rigidly mounted on supporting columns only one of which, to wit 17, is visible on the drawings, each of these plates being electrically insulated from the others and from the earth by moulded and rectified steatite parts provided with rings 19 so as to prevent, as known in electrostatic apparatus, electric leaks between the high voltage plates and the collector plates. The distance of the plates from one another is 6 mm. Three outputs, insulated by means of steatite and only two of which, 20 and 21, are shown, are provided for the electrodes. Boron 10 is introduced into the chamber in the form of a solid superficial deposit of powdery boron. The area of each of the boron deposits is about 50 sq.cm. and their mean density is 0.8 m./sq.cm. There are six similar deposits in the apparatus, according to the showing of Fig. 2. The filling gas is argon at atmospheric pressure.

The adjustment device according to the invention is mounted with the preamplifier 22 incorporated in the apparatus. It essentially includes a circular sector 12 of aluminium having an area of some square centimeters, said sector being pivotable about a spindle fixed on the output terminal 20 of the collector electrode 10, said sector moving between two pairs of plates 11, 13 and 14, 15. Plates 11 and 13 are mounted through steatite insulators on the supporting column 23 and are connected, through means not visible on the drawings, with the positive terminal 21. Plates 14 and 15 are similarly mounted on supporting column 24 and connected through means not shown on the drawings with the negative terminal (which is not shown).

When mounted at the outlet of the reflector of a nuclear reactor, which is its normal position of operation, the apparatus of Fig. 4 has its compensation ratio improved by a factor equal to 2 with respect to the old arrangement.

Figure 5:
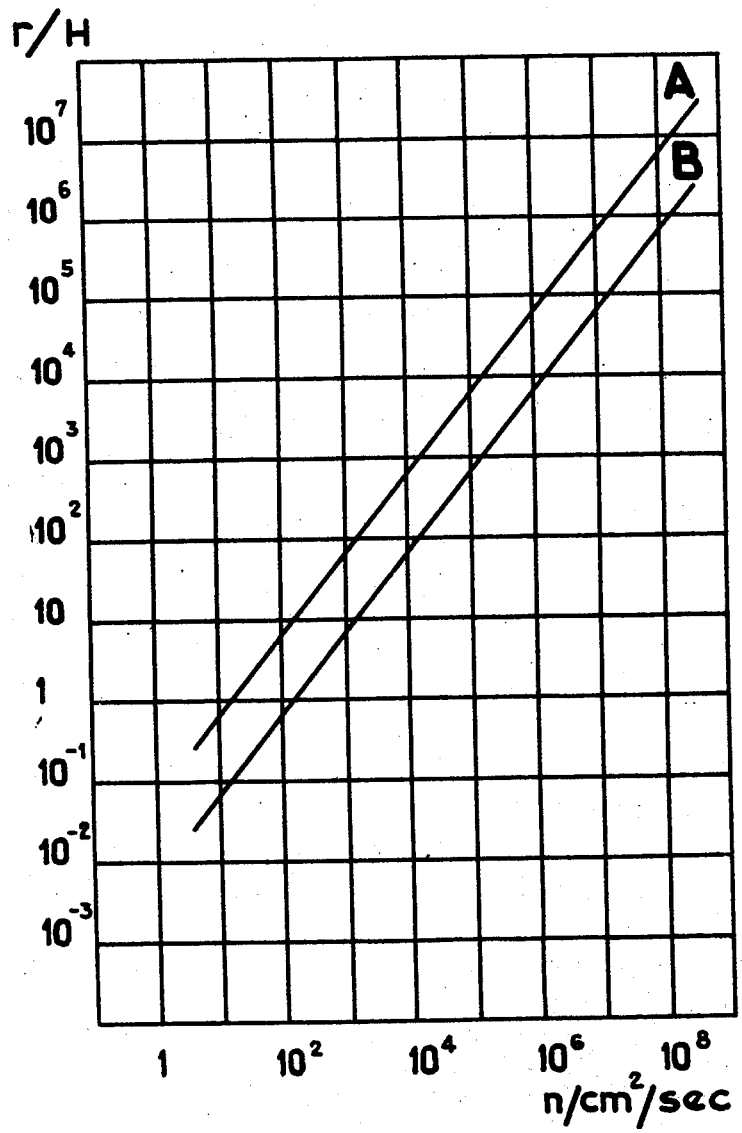
Fig. 5 is a diagram showing curves illustrating the operation of the system according to the invention.

Fig. 5 shows the curves of the maximum gamma fluxes as a function of the neutrons for which the apparatus permits measurement (argon filling at the pressure of 76 cm. of mercury):

(a) With an accuracy of 10% (curve A),
(b) With an accuracy of 1% (curve B).

The number of neutrons per sq. cm. and per second is plotted in abscissas and the number of roentgens per hour is plotted in ordinates.

The other characteristics of the compensated ionization chamber system, to wit:

(a) The saturation voltage of the apparatus for different values of the neutron flux, which must be as low as possible, (b) The current delivered by the apparatus (at M) which must be proportional to the neutron flux, (c) The sensitivity of the apparatus to neutrons which is $2,10^{-14}$ ampere per n/sq.cm./sec. in the cited example, (d) The range of utilization of the standard apparatus which permits, in fixed position and without any flux attenuating screen, of measuring the power of the reactor over a flux range of six decades, are not modified.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claims.

What I claim is:

1. A compensated ionization chamber system which comprises, in combination, a casing, at least two electrodes in said casing kept respectively at a high positive potential and at a high negative potential, a third electrode in said casing located between said two first mentioned electrodes so as to limit therewith two adjacent elementary ionization chambers, a neutron sensitive coating on the wall of one of said chambers, means for measuring the variation of potential of said third electrode, and means forming externally of said two elementary ionization chambers a third ionization chamber, said third chamber being non-responsive to neutrons, said third ionization chamber including an electrode electrically connected with said third electrode and means for quickly and accurately adjusting said third ionization chamber.

2. A compensated ionization chamber system which comprises, in combination, a casing, at least two electrodes in said casing kept respectively at a high positive potential and at a high negative potential, a third electrode in said casing located between said two first mentioned electrodes so as to limit therewith two adjacent elementary ionization chambers, a neutron sensitive coating on the wall of one of said chambers, means for measuring the variation of potential of said third electrode and means forming externally of said two elementary ionization chambers, a third ionization chamber, said third chamber being non responsive to neutrons, said third ionization chamber including an electrode electrically connected with said third electrode and means for adjusting the position of said fourth mentioned electrode in said third ionization chamber.

3. A compensated ionization chamber system according to claim 2 in which said third ionization chamber includes at least two plates one of which is at a potential higher than that of said fourth mentioned electrode and the other at a potential lower than that of said fourth mentioned electrode, said fourth mentioned electrode being in the form of a plate pivoted about an axis at right angles thereto, said last mentioned plate being offset with respect to said axis and said two first mentioned plates being located on opposite sides of said axis and being parallel to said third mentioned plate.

4. A compensated ionization chamber according to claim 3 in which said fourth mentioned electrode is a plate having an outline in the form of a circular sector the center of which is on said axis.

References Cited in the file of this patent

UNITED STATES PATENTS

| 2,714,677 | MacNeille | Aug. 2, 1955 |
| 2,724,779 | McKay | Nov. 22, 1955 |
| 2,797,332 | Hill | June 25, 1957 |